(12) United States Patent
Busscher et al.

(10) Patent No.: US 11,629,551 B2
(45) Date of Patent: Apr. 18, 2023

(54) ELECTRO-OPTIC WINDOW ASSEMBLY

(71) Applicant: Gentex Corporation, Zeeland, MI (US)

(72) Inventors: Bradley L. Busscher, Grand Rapids, MI (US); Ted D. Reeves, Hamilton, MI (US); David I. Driscoll, Caledonia, MI (US); Peter T. Kantola, Ravenna, MI (US); Christian M. Kemperman, Grand Haven, MI (US); Carl N. Wassink, Holland, MI (US); Robert R. Turnbull, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 700 days.

(21) Appl. No.: 16/659,161

(22) Filed: Oct. 21, 2019

(65) Prior Publication Data

US 2020/0123845 A1 Apr. 23, 2020

Related U.S. Application Data

(60) Provisional application No. 62/748,494, filed on Oct. 21, 2018.

(51) Int. Cl.
*E06B 9/24* (2006.01)
*B32B 17/10* (2006.01)
(Continued)

(52) U.S. Cl.
CPC .......... *E06B 9/24* (2013.01); *B32B 17/10467* (2013.01); *B60J 3/04* (2013.01); *G02B 5/003* (2013.01); *E06B 2009/2464* (2013.01)

(58) Field of Classification Search
CPC ............ B64C 1/1484; B32B 17/10495; B32B 17/10293; B32B 2605/18;
(Continued)

(56) References Cited

U.S. PATENT DOCUMENTS 5,274,493 A 12/1993 Couput et al.
6,084,702 A 7/2000 Byker et al.
(Continued)

FOREIGN PATENT DOCUMENTS

DE 102014224386 A1 6/2016
EP 2128688 A1 12/2009

*Primary Examiner* — Mariam Qureshi
(74) *Attorney, Agent, or Firm* — Price Heneveld LLP; Brian James Brewer

(57) ABSTRACT

A unitary electro-optic window assembly includes a window element. A first substantially transparent substrate defines a first surface, a second surface, and a first peripheral edge. A second substantially transparent substrate defines a third surface, a fourth surface, and a second peripheral edge. The first and second substantially transparent substrates define a cavity therebetween. An electro-optic medium at least partially fills the cavity and is configured to reduce light transmissivity of the window element. A controller is adjacent to the window element and is in electrical communication therewith. The controller is configured to change a voltage applied to the electro-optic medium to change the light transmissivity of the window element. An interface is in electrical communication with the controller. A transparent dust cover is positioned over the window element, the controller, and the interface.

14 Claims, 12 Drawing Sheets

(51) Int. Cl.
*B60J 3/04* (2006.01)
*G02B 5/00* (2006.01)

(58) Field of Classification Search
CPC ....... B32B 17/10467; E06B 2009/2464; E06B 9/24; G02B 5/003; B60J 3/04
See application file for complete search history.

(56) References Cited

U.S. PATENT DOCUMENTS

| | | | |
|---|---|---|---|
| 7,525,714 B2 | 4/2009 | Poll et al. | |
| 7,535,614 B1 | 5/2009 | Tapley et al. | |
| 7,985,467 B1* | 7/2011 | Shu | H01J 33/04 |
| | | | 428/411.1 |
| 7,990,603 B2 | 8/2011 | Ash et al. | |
| 8,547,624 B2 | 10/2013 | Ash et al. | |
| 9,176,357 B2 | 11/2015 | Lam et al. | |
| 9,606,412 B2 | 3/2017 | Geerlings et al. | |
| 10,023,028 B2 | 7/2018 | Bungo et al. | |
| 10,137,764 B2 | 11/2018 | Driscoll et al. | |
| 10,247,996 B2 | 4/2019 | Driscoll et al. | |
| 2002/0075552 A1 | 6/2002 | Poll et al. | |
| 2002/0135881 A1 | 9/2002 | Rukavina et al. | |
| 2006/0274218 A1 | 12/2006 | Xue | |
| 2013/0161971 A1* | 6/2013 | Bugno | B64C 1/1484 |
| | | | 296/97.2 |
| 2013/0278989 A1* | 10/2013 | Lam | G02F 1/15165 |
| | | | 359/275 |
| 2015/0251746 A1 | 9/2015 | Schmid et al. | |
| 2015/0354790 A1 | 12/2015 | Ash et al. | |
| 2018/0286908 A1 | 10/2018 | Yamazaki et al. | |
| 2018/0314081 A1* | 11/2018 | Hoggarth | G10K 11/175 |
| 2019/0066962 A1 | 2/2019 | Chuang et al. | |
| 2019/0265570 A1* | 8/2019 | Whittingham | G02F 1/1533 |
| 2019/0353969 A1 | 11/2019 | Tonar | |

* cited by examiner

ELECTRO-OPTIC WINDOW ASSEMBLY

CROSS-REFERENCE TO RELATED APPLICATION

This application claims priority to and the benefit under 35 U.S.C. § 119(e) of U.S. Provisional Application No. 62/748,494, filed on Oct. 21, 2018, entitled "ELECTRO-OPTIC WINDOW ASSEMBLY," the disclosure of which is hereby incorporated herein by reference in its entirety.

FIELD OF THE DISCLOSURE

The present disclosure generally relates to an electro-optic window assembly, and more particularly to an electro-optic window assembly including a window element allowing for variances in transmissivity.

SUMMARY OF THE DISCLOSURE

According to one aspect of the present disclosure, a unitary electro-optic window assembly includes a window element. A first substantially transparent substrate defines a first surface, a second surface, and a first peripheral edge. A second substantially transparent substrate defines a third surface, a fourth surface, and a second peripheral edge. The first and second substantially transparent substrates define a cavity therebetween. An electro-optic medium at least partially fills the cavity and is configured to reduce light transmissivity of the window element. A controller is adjacent to the window element and is in electrical communication therewith. The controller is configured to change a voltage applied to the electro-optic medium to change the light transmissivity of the window element. An interface is in electrical communication with the controller. A transparent dust cover is positioned over the window element, the controller, and the interface.

According to another aspect of the present disclosure, an electro-optic window assembly includes an electro-optic window element. A controller is operably coupled with the electro-optic window element and is in electrical communication therewith. The controller is configured to change a voltage applied to an electro-optic medium to change a light transmissivity of the electro-optic window element. An interface is in electrical communication with the controller. The interface includes an elongate digital slide toggle disposed between an indicia representative of a clear window state and an indicia representative of a dark window state.

According to yet another aspect of the present disclosure, an electro-optic window assembly includes an electro-optic element that has a first substrate and a second substrate. An electro-optic medium is disposed between the first substrate and the second substrate and a frame is disposed about the electro-optic element. A carrier is disposed adjacent to an edge of the electro-optic element and is configured to receive a control unit. The control unit includes a controller that is operably coupled with the window element and in electrical communication therewith. The controller is configured to change a voltage applied to the electro-optic medium to change a light transmissivity of the window element. An interface is in electrical communication with the controller. The control unit also includes at least one of a power connector and a data connector. A protective substrate extends over the first substrate and the interface.

These and other features, advantages, and objects of the present disclosure will be further understood and appreciated by those skilled in the art by reference to the following specification, claims, and appended drawings.

DETAILED DESCRIPTION

Figure 1A:
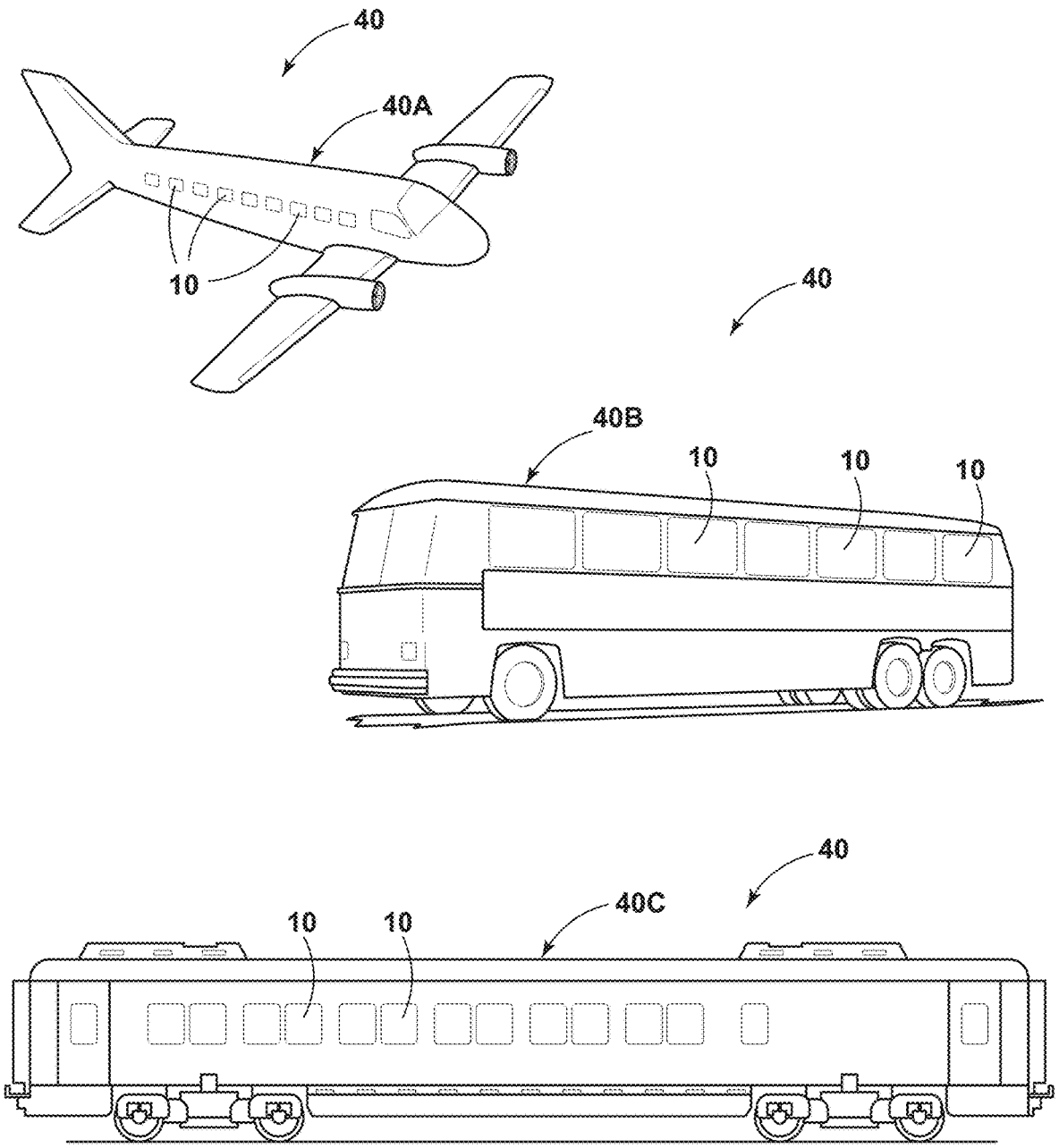
FIG. 1A is a general illustration of multi-passenger vehicles incorporating variable transmission window systems according to the present disclosure.

The present illustrated embodiments reside primarily in combinations of method steps and apparatus components related to an electro-optic window assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1B:
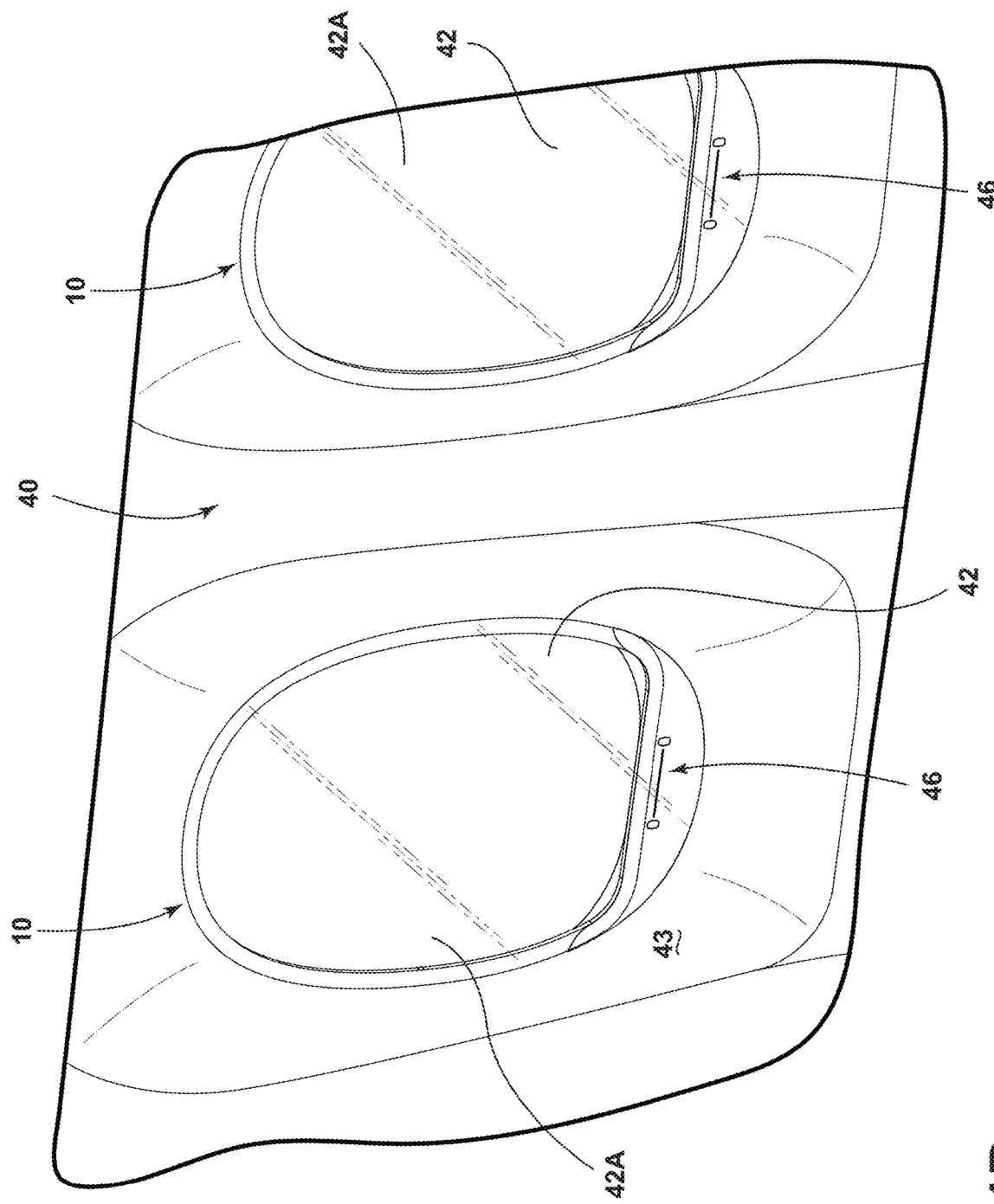
FIG. 1B is a front perspective view of an electro-optic window assembly of the present disclosure in an aircraft.

For purposes of description herein, the terms "upper," "lower," "right," "left," "rear," "front," "vertical," "horizontal," and derivatives thereof, shall relate to the disclosure as oriented in FIG. 1B. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The present disclosure is generally related to a variable transmission window system that includes various window configurations that have a user interface configured to select different degrees of transmittance through an electro-optic element. The disclosure, as set forth herein, provides an effective and coordinated control of individual variable transmission windows throughout a multi-passenger vehicle. In addition, multiple modes of operation that are responsive to an individual's preferences are set forth herein. The variable transmission window system, as set forth herein, also ensures uniformity of dimming, minimal dimming and clearing time, minimal power consumption, and provides a robust and protected assembly. The variable transmission window system (window element, controller, user interface, dust cover) is integrated into one unit and is also configured to withstand environmental factors including moisture, power surges, excessive heat, and physical loading (680 N abuse load) that may be applied to the variable transmission window system in a very thin space.

In addition, the user interface of the variable transmission window system, for changing the relative transmittance of the electro-optic window assembly, is a control that is easy to understand. The user interface is generally devoid of moving parts, and instead relies on electrical features that provide reliability, repeatability, and longevity to the variable transmission window system as a whole. The user interface also includes back-lighting so that the user interface is readily discernable and understandable, even in darkened conditions.

Referring to FIGS. 1A-7, reference numeral 10 generally designates a unitary electro-optic window assembly including a window element 12. The window element 12 includes a first substantially transparent substrate 14 defining a first surface 16, a second surface 18, and a first peripheral edge 20. The window element 12 also includes a second substantially transparent substrate 22 defining a third surface 24, a fourth surface 26, and a second peripheral edge 28. The first and second substantially transparent substrates 14, 22 define a cavity 30 therebetween. An electro-optic medium 32 at least partially fills the cavity 30 and is configured to reduce light transmissivity of the window element 12. A controller 34 is integrally attached to the window element 12 and is in electrical communication therewith. The controller 34 is configured to change a voltage applied to the electro-optic medium 32 to change the light transmissivity of the window element 12.

With reference to FIG. 1A, the variable transmission window system, as set forth herein, is configured for use with any of a variety of multi-passenger vehicles 40. Specifically, the multi-passenger vehicles 40 that may include the variable transmission window system include, for example, an aircraft 40A, a bus 40B, a train 40C, etc. It will be understood that other multi-passenger vehicles 40 may also include the electro-optic window assembly 10. The multi-passenger vehicles 40 illustrated also include a user interface (passenger control interface) 46 for controlling the operation and transmittance of the electro-optic window assembly 10. With reference to FIG. 1B, a general illustration of a variable transmission window system is provided. The variable transmission window system includes the electro-optic window assembly 10 that is operably coupled with the controller 34 and the user interface 46. Although the controller 34 (FIG. 4) and the user interface 46 are illustrated as being at a lower position relative to the electro-optic window assembly 10, it will be understood that the controller 34 and the user interface 46 may be positioned anywhere adjacent to, or in some general proximity to, the electro-optic window assembly 10.

With reference again to FIGS. 1A-4, 6, and 7, the illustrated electro-optic window assembly 10 is generally configured for use in the multi-passenger vehicle 40 and includes a protective substrate in the form of a dust cover 42 configured to protect the window element 12 of the electro-optic window assembly 10 from dust, dirt, and debris, as well as damage by a user. The dust cover 42 may be any material including glass, clear polycarbonate, acrylic, etc. The dust cover 42 will generally include a shape that is consistent with the shape of the window element 12, but it will be understood that the dust cover 42 may also take on other shapes. The dust cover 42 may be generally coextensive with an interior surface 43 of the multi-passenger vehicle 40 such that a front surface 42A of the dust cover 42 may be flush or even with the interior surface 43 of the multi-passenger vehicle 40. As illustrated in FIG. 1B, the dust cover 42 may be coextensive with the interior surface 43 of a fuselage of the multi-passenger vehicle 40. The dust cover 42 also serves as a protective cover for the user interface 46. The user interface 46 is disposed behind the dust cover 42 and therefore is generally protected from dust, filth, debris, water, etc. by the dust cover 42. The dust cover 42 also protects the user interface 46, the controller 34, and/or the window element 12 from possible damage and from being tampered with during use. As a result, the user interface 46 is configured to receive input directions from the user through the dust cover 42. In some instances, the user interface 46 positioned behind the dust cover 42 may include capacitive touch or resistive touch features, etc. In an instance where the user interface 46 includes capacitive touch features, the user interface 46 may be adjusted by the user based on the user placing a finger on a portion of the dust cover 42 disposed over the user interface 46 to lighten or dim the electro-optic window assembly 10. It will be understood that the user interface 46 behind the dust cover 42 may include a switch or sensor 48 such that when the user contacts the dust cover 42, a small degree of charge is drawn to the point of contact of the finger, thereby acting as a capacitor. The change in the electrostatic field is evaluated to determine the position of the finger. When the position of the finger has been determined by the controller 34, an adjustment to darken or lighten the electro-optic window assembly 10 can be made.

Figure 2:
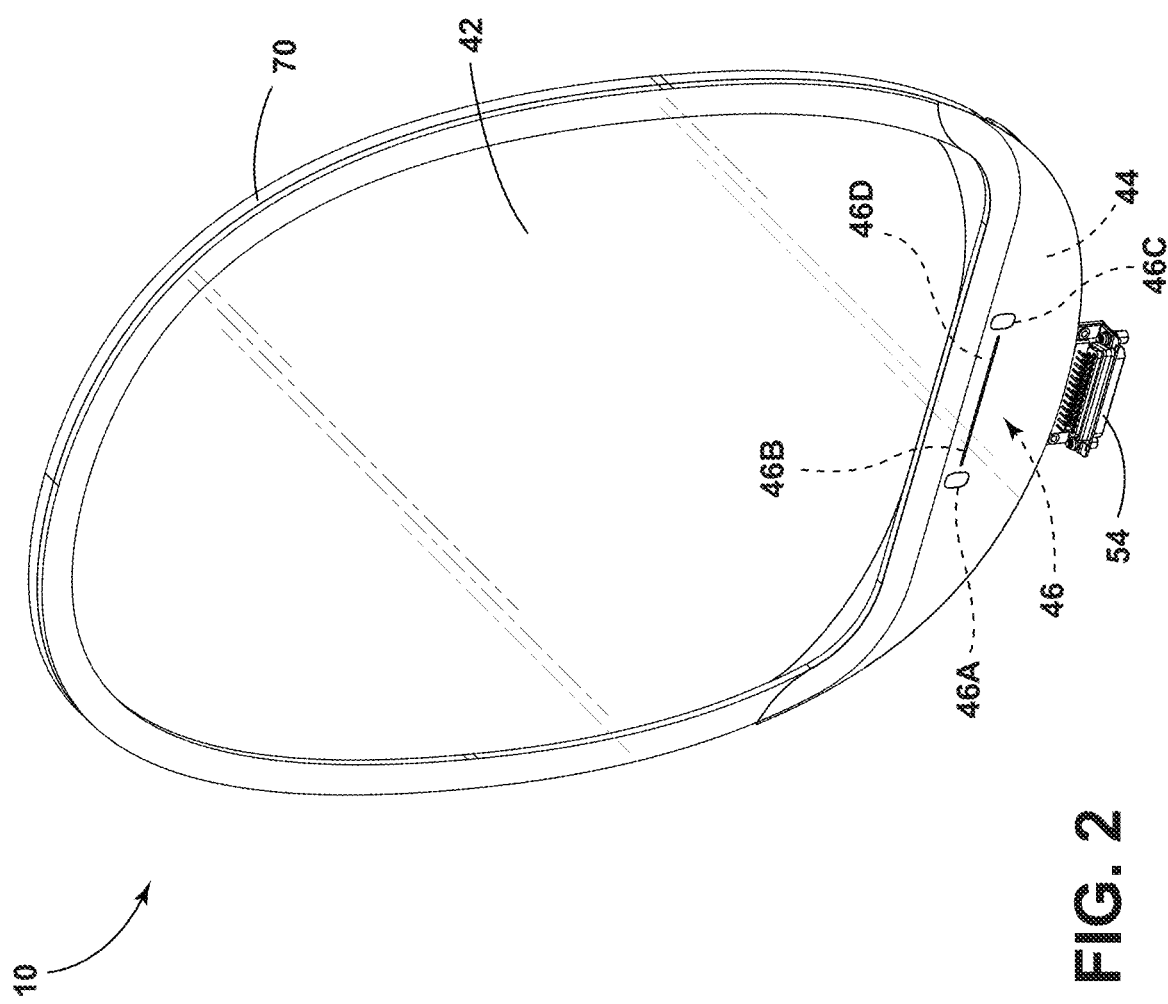
FIG. 2 is a front perspective view of an electro-optic window assembly of the present disclosure.

With reference to FIG. 2, the user interface 46 generally includes indicia that is representative of a clear window state and indicia that is representative of a dark window state. For example, the user interface 46, as illustrated, includes a clear window indicia 46A, a status bar 46B, and a dark window indicia 46C. The user interface 46 may operate in any of a multitude of ways. For example, the user may increase the transmittance of the window element 12 by touching the clear window indicia 46A, until the status bar 46B indicates that maximum transmittance has been reached. A visual indication of no backlighting of the status bar 46B may indicate maximum transmittance has been obtained. The status bar 46B may provide information by showing a decrease in illumination in the status bar 46B, or by showing lighting within the status bar 46B lessening from right to left as the window element 12 reaches maximum transmittance. In another instance, the status bar 46B may be used with, or replaced by, an elongate digital slide toggle 46D that has sensor functionality, such that the user can touch the slide toggle 46D and slide a finger from right to left (from the dark window indicia 46C to the clear window indicia 46A). The change in the capacitance as the finger moves across the slide toggle 46D is detected by the controller 34, which applies less voltage to the window element 12, thereby increasing the transmittance of the window element 12. The opposite function can also be performed. For example, the user can touch the slide toggle 46D and slide a finger from left to right (from the clear window indicia 46A to the dark window indicia 46C). As the finger moves across the slide toggle 46D, the change in the capacitance is detected by the controller 34. The controller 34 increases the voltage applied to the electro-optic medium 32 of the window element 12 and the transmittance of the window element 12 decreases.

The controller 34 is part of a control unit illustrated as a circuit board assembly 50 that includes a power and/or data connector 54 operably coupled therewith. The power and/or data connector 54 is in communication with the circuit board assembly 50 and is configured to provide power and/or data to the window element 12.

Figure 3:
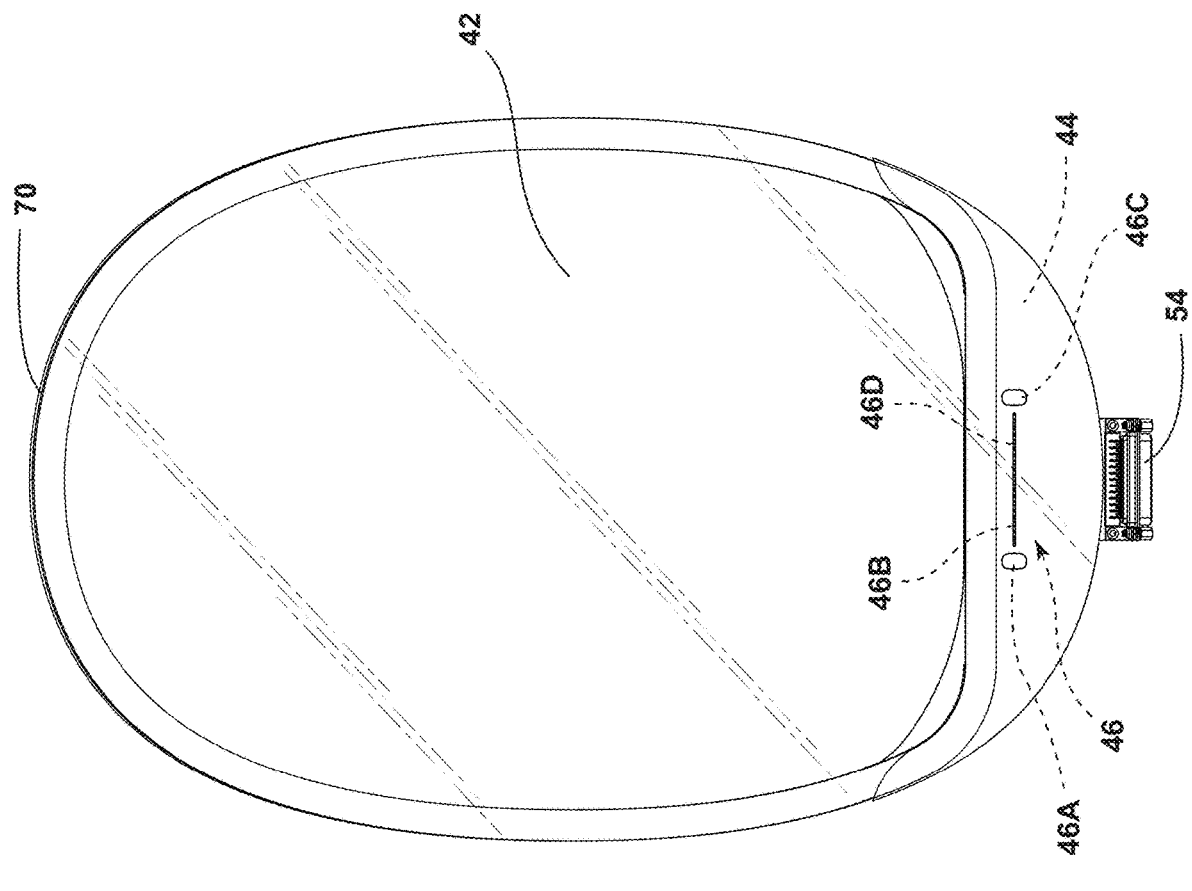
FIG. 3 is a front elevational view of an electro-optic window assembly of the present disclosure.

With reference again to FIGS. 2-4, it will also be understood that the dust cover 42 may terminate proximate a lower end of a rear housing generally defining a frame 70 of the window element 12. In this instance, the user may contact the user interface 46 directly. An appliqué 44 is disposed behind the dust cover 42. The appliqué 44 is generally configured to provide the interface 46 for the user to adjust the transmissivity of the window element 12. The frame 70 may be constructed from a variety of materials including metal, polymers, etc. The appliqué 44 may complement resistive or capacitive sensor functionality such that the controller 34 can determine where the user has contacted the user interface 46. In use, the user may select a light side or a dark side of the appliqué 44 to increase the transmissivity of the window element 12 or to decrease the transmissivity of the window element 12, respectively. The sensor 48 may be disposed behind the appliqué 44 and generally configured to sense application of force or contact by the user. For example, the sensor 48 may include capacitive touch or resistive touch features such that upon contact of the finger of the user on the dust cover 42, the sensor 48 may be actuated, thereby resulting in increased or decreased transmissivity of the window element 12. The power and/or data connector 54 may be positioned proximate the controller 34 and the user interface 46, as illustrated in FIGS. 2 and 3. However, the power and/or data connector 54 may also be positioned at a different location about the frame 70.

Figure 4:
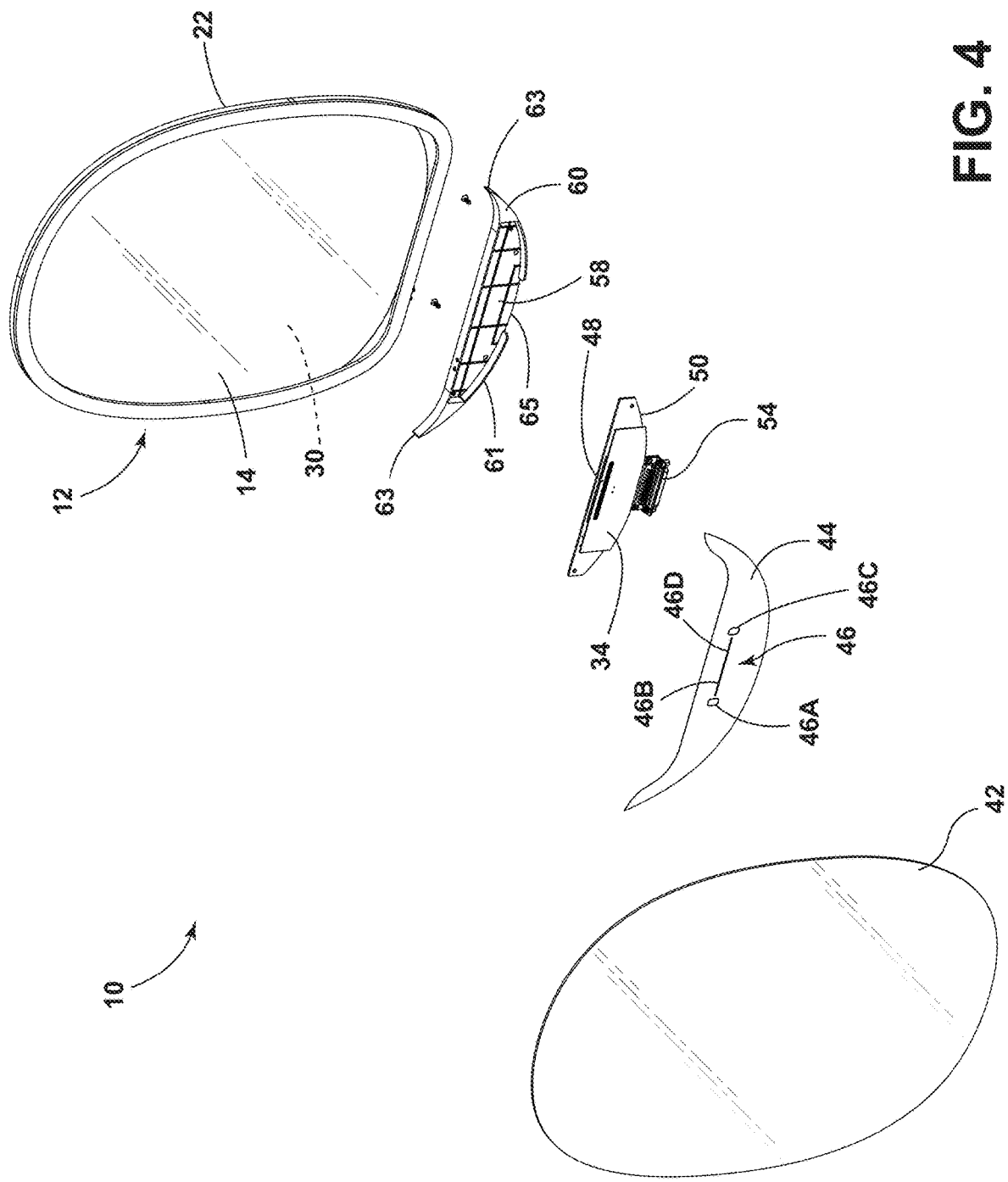
FIG. 4 is an exploded front perspective view of an electro-optic window assembly of the present disclosure.

With reference now to FIG. 4, the entire circuit board assembly 50 is configured to rest within a front opening 58 of a carrier 60. The front opening 58 is defined by a peripheral carrier rim 61 with upturned edges 63. The power and/or data connector 54 extends down through a slot 65 in the carrier rim 61 and connects with a complementary plug of the multi-passenger vehicle 40. The power and/or data connector 54 is configured to rest within the front opening 58 of the carrier 60. The carrier 60 includes a main body with an upper flange that abuts a lower portion of the electro-optic window element 12. In addition, the upturned edges 63 of the carrier 60 are configured to taper into edges of the frame 70 to provide a smooth and aesthetically pleasing contour to the electro-optic window assembly 10. The carrier 60 may also be disposed below the window element 12 and adjacent to a bottom side or edge thereof. It will be understood that the carrier 60 may include an internal support frame configured to provide additional rigidity to the carrier 60. As previously noted, the entire circuit board assembly 50 is configured to sit within the opening 58 with the power and/or data connector 54 extending downward through a lower slot that is in communication with the opening 58. The controller 34 may be disposed on a forward or rearward circuit board, or both the forward and rearward circuit board, and configured to increase or decrease an electrical charge that is applied to the electro-optic medium 32 that is disposed between the first transparent substrate 14 and the second transparent substrate 22. The sensor 48 is disposed on the forward circuit board of the controller 34, and is generally aligned with the interface 46 disposed on the appliqué 44. The appliqué 44 includes a configuration that is generally larger than that of the carrier 60, thereby concealing the carrier 60 and the forward and rearward circuit boards behind the appliqué 44. The dust cover 42 is then positioned over the window element 12 and the appliqué 44.

Figure 5A:
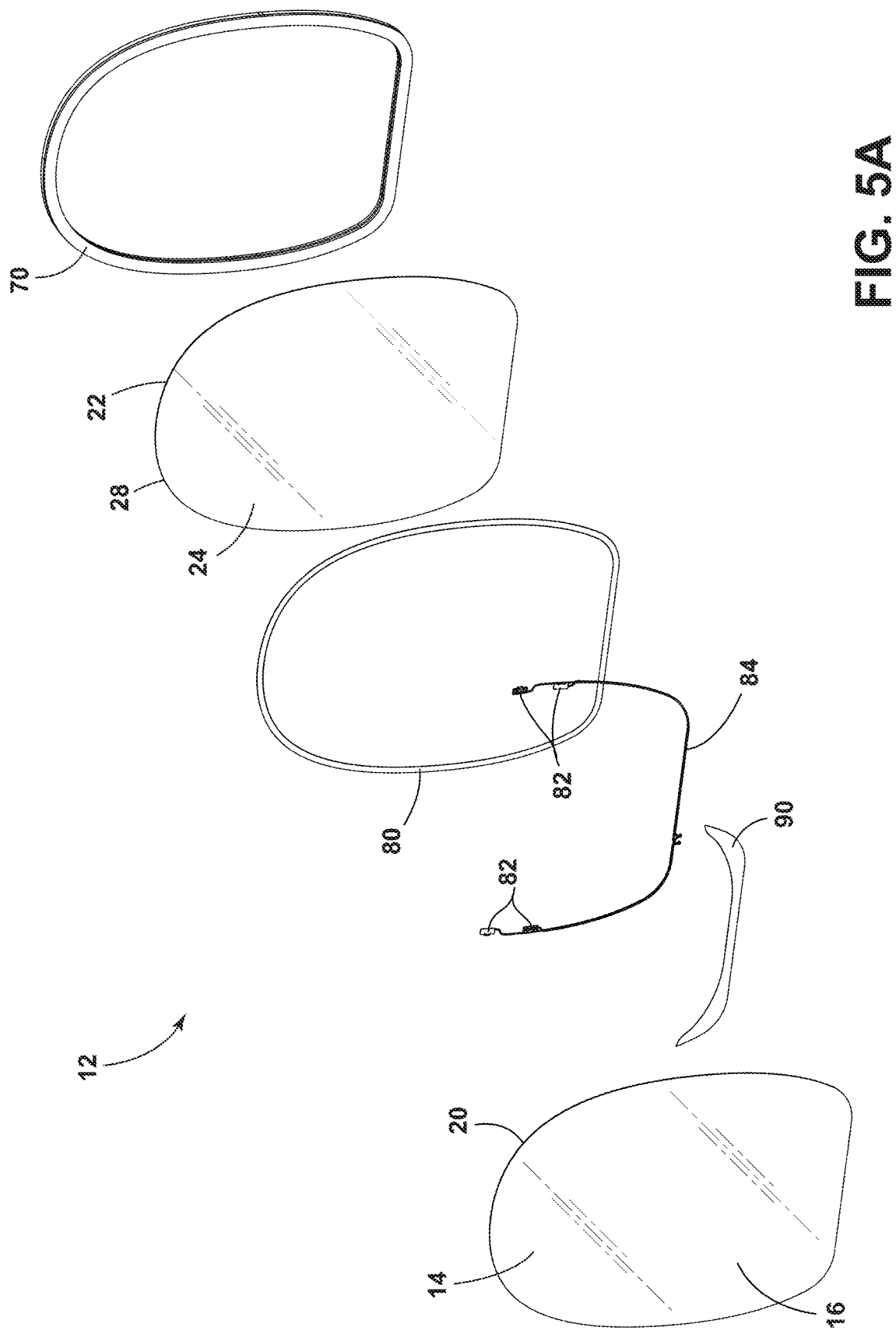
FIG. 5A is an exploded front perspective view of a window element of the electro-optic window assembly of the present disclosure.
Figure 5B:
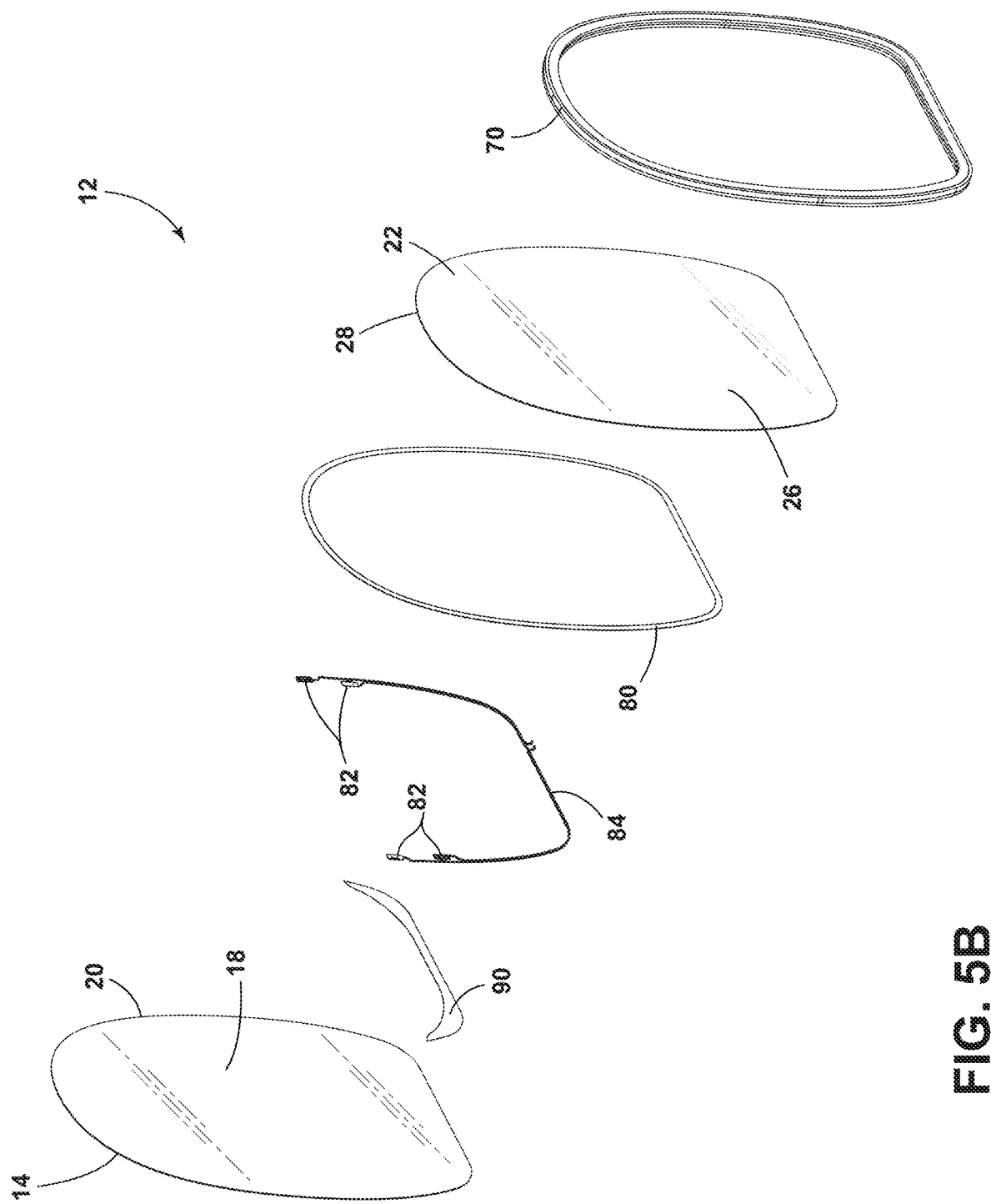
FIG. 5B is an exploded rear perspective view of a window element of the electro-optic window assembly of the present disclosure.

With reference now to FIGS. 5A and 5B, the window element 12 may include the frame 70 disposed about a periphery of the window element 12 that is configured to abut the dust cover 42. It is also contemplated that the frame 70 may be formed from foam or other materials. A seal 80 is disposed between the first substantially transparent substrate 14 and the second substantially transparent substrate 22 and extends about the cavity 30 and electro-optic medium 32. In addition, electrical contacts 82 are in electrical communication with the controller 34 via a wiring assembly 84 and control a voltage applied to the electro-optic medium 32. A lower trim piece 90 may also cover a lower end of the window element 12. The wiring assembly 84, and specifically, the electrical contacts 82, are configured to apply a potential differential to the electro-optic medium 32, thereby changing the transmittance of the electro-optic medium 32 disposed between the first substrate 14 and the second substrate 22. Stated differently, the electro-optic medium 32 will darken or lighten based on an electric current applied to the electro-optic medium 32. When the voltage moves through the electro-optic medium 32, the electro-optic medium 32 will darken. The electro-optic medium 32 will continue to darken as more voltage is applied. When the voltage is removed, the electro-optic medium 32 will begin to lighten or clear.

With reference again to FIGS. 4-5B, it will be understood that the dust cover 42 may be serviceable or replaceable without replacing the entire electro-optic window assembly 10. Consequently, when servicing or replacing the dust cover 42 is necessary, the entire electro-optic window assembly 10 need not be replaced, just the dust cover 42.

In sum, a user can simply select a side of the appliqué 44 which is in communication with the sensor 48 of the circuit board assembly 50. Upon selection of one side of the appliqué 44, either on the dark window indicia 46C or on the slide toggle 46D proximate the dark window indicia 46C, the transmissivity of the window element 12 may darken. If the user wishes to increase a view out the electro-optic window assembly 10, the user can increase the transmissivity by selecting an opposite side of the appliqué 44, either on the clear window indicia 46A or on the slide toggle 46D proximate the clear window indicia 46A.

Figure 6:
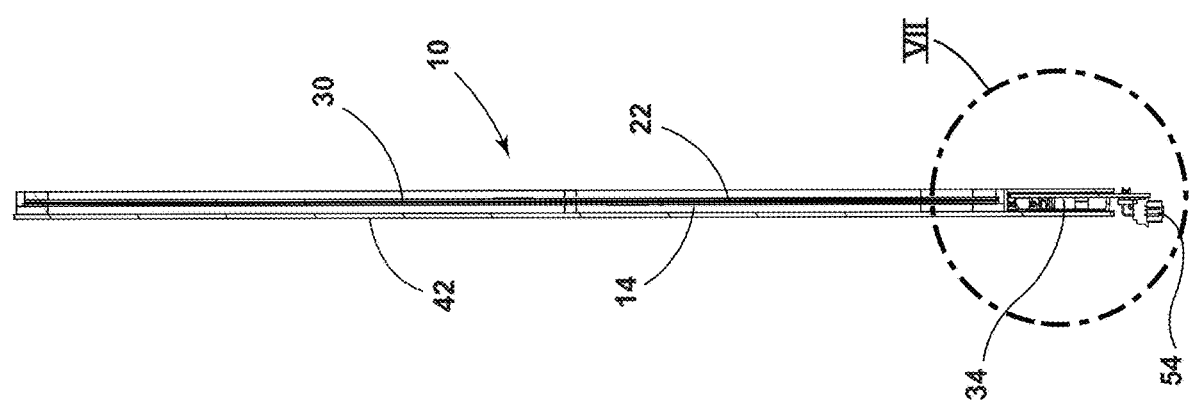
FIG. 6 is a side elevational view of a window element of the electro-optic window assembly of the present disclosure.
Figure 7:
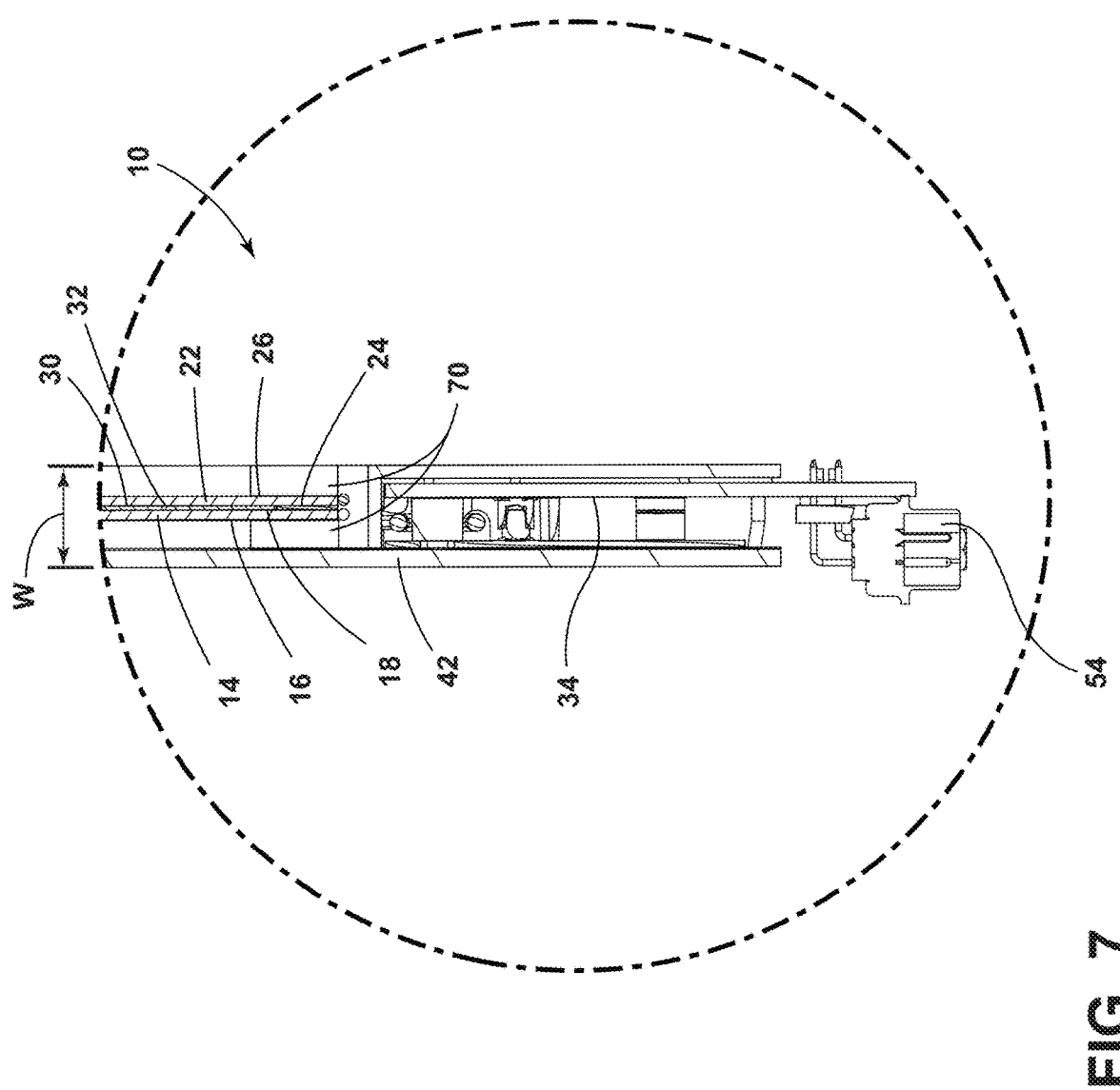
FIG. 7 is an enlarged side elevational view of the area VII of the window element of FIG. 6
Figure 9:
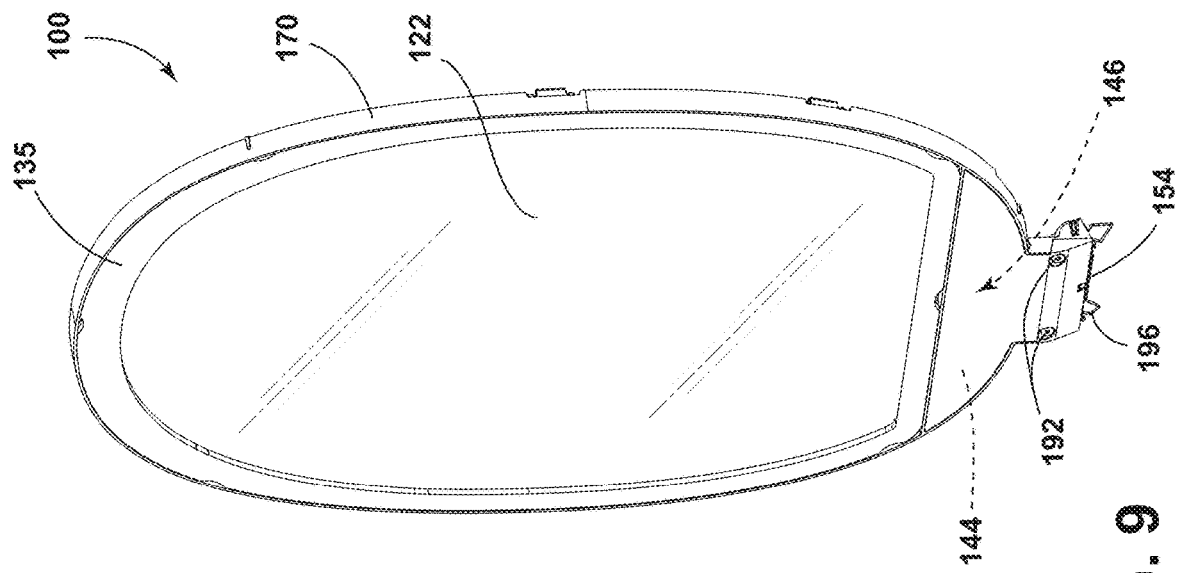
FIG. 9 is a rear perspective view of the electro-optic window assembly of FIG. 8.

With reference now to FIGS. 6 and 7, the profile of the electro-optic window assembly 10 is generally thin. The power and/or data connector 54 is generally aligned vertically with a planar extent of the window element 12. This lean configuration takes up minimal room within the multi-passenger vehicle 40. More specifically, a width W (FIG. 7), measured from the first substantially transparent substrate 14 to a back side of the frame 70, measures only 12.9 mm. This minimal thickness is a substantial improvement over other dimming window assemblies which may be several inches thick. In addition to having a thin construction, the electro-optic window assembly 10 can withstand an abuse load of at least 680 Newtons over a 16 square inch area applied to a center of the window element 12. It will be understood that the power and/or data connector 54 will engage a complementary plug within the multi-passenger vehicle 40.

Figure 8:
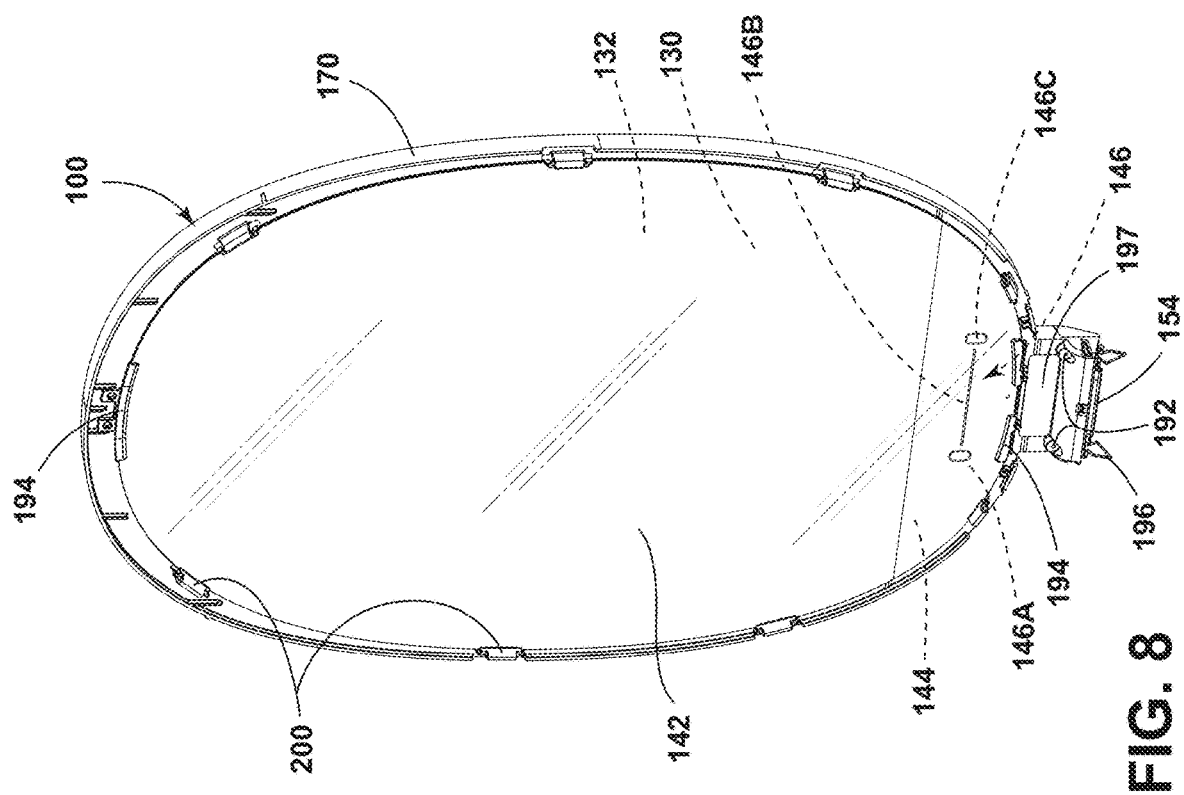
FIG. 8 is a front perspective view of an electro-optic window assembly of the present disclosure.
Figure 10:
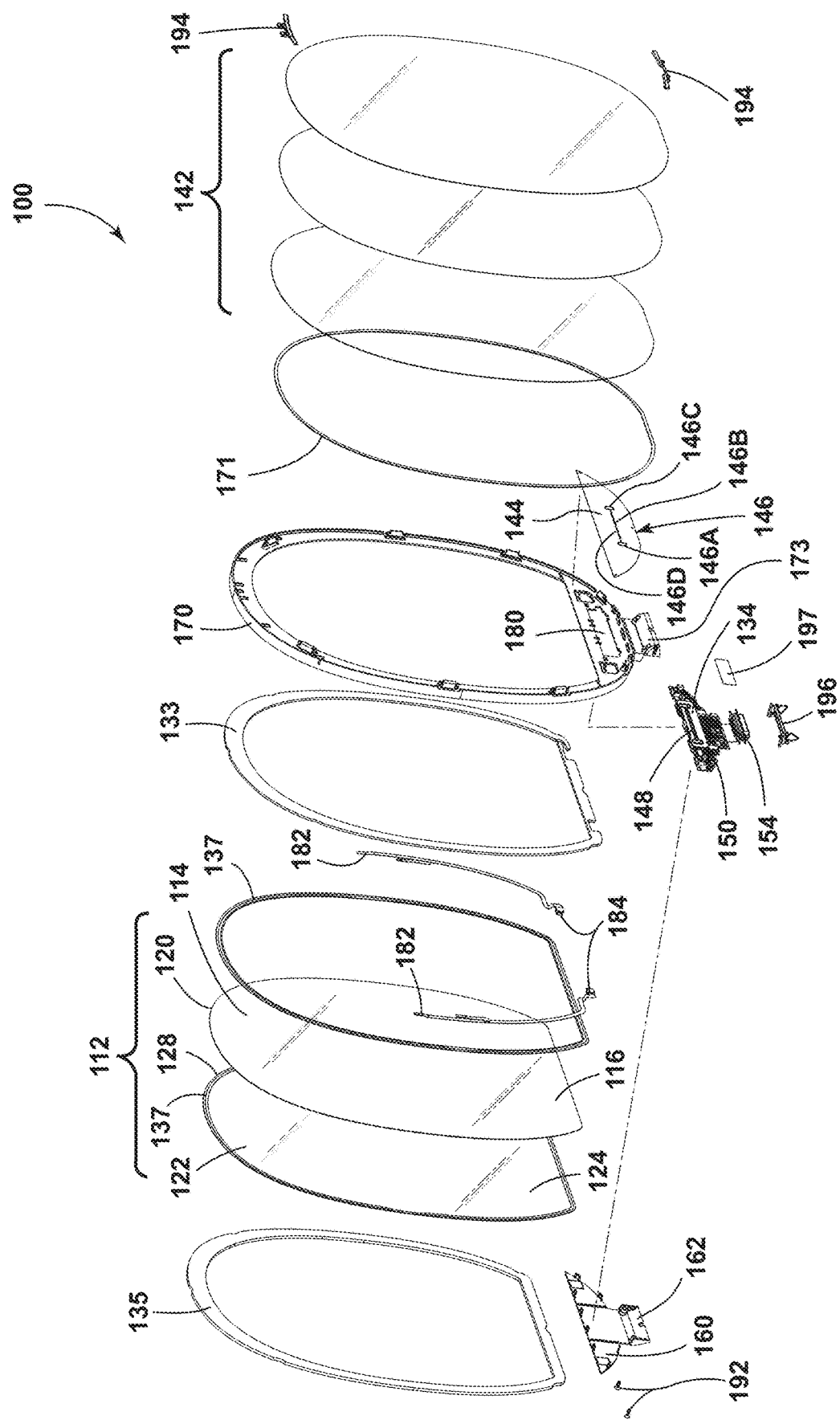
FIG. 10 is an exploded front perspective view of the electro-optic window assembly of FIG. 8.
Figure 11:
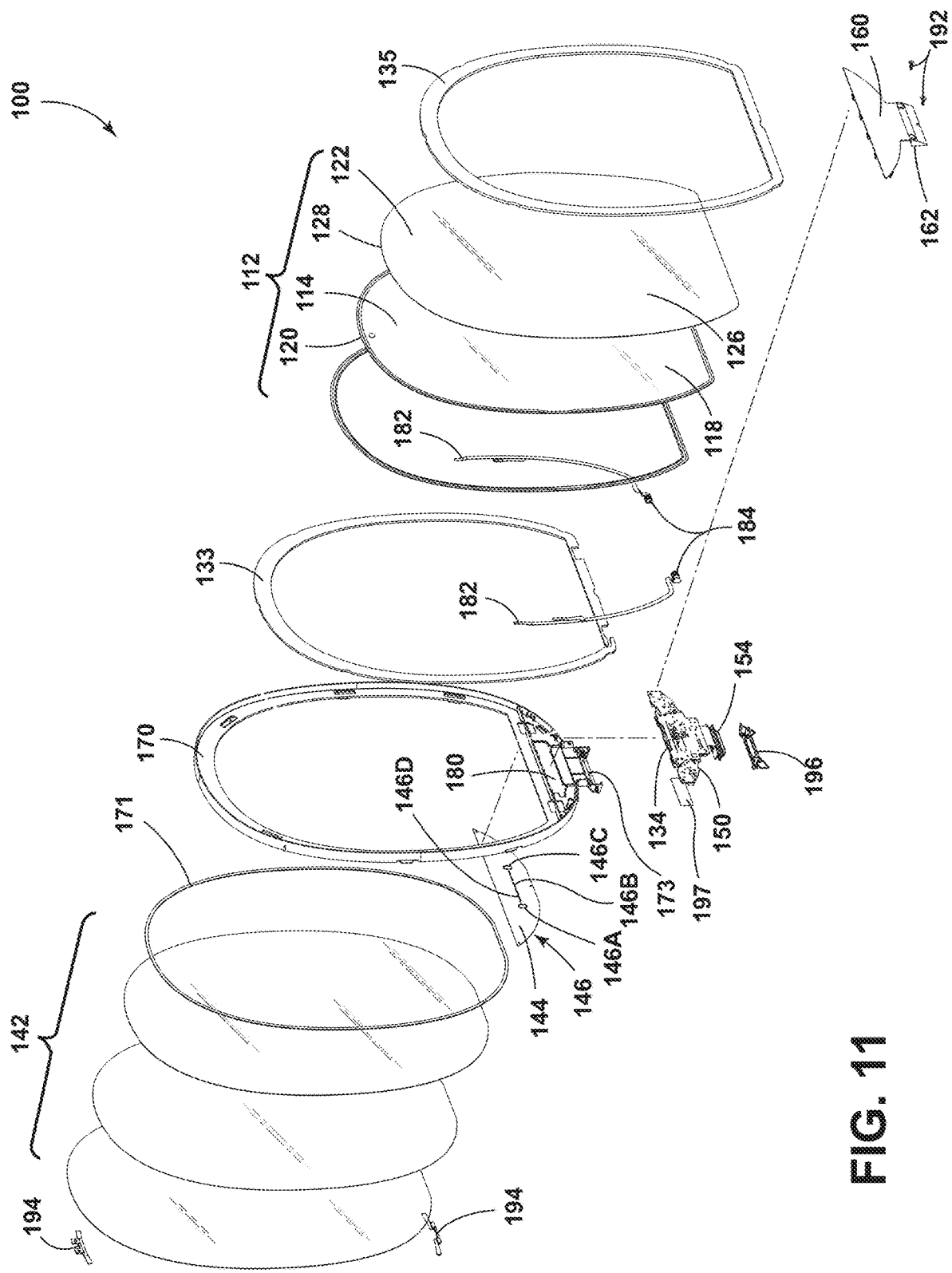
FIG. 11 is an exploded rear perspective view of the electro-optic window assembly of FIG. 8.

FIGS. 8-11 illustrate a variable transmission window system that incorporates an electro-optic window assembly 100. The electro-optic window assembly 100 includes a window element 112. The window element 112 includes a first substantially transparent substrate 114 that defines a first surface 116 and a second surface 118. The first substantially transparent substrate 114 defines a first peripheral edge 120. The window element 112 includes a second substantially transparent substrate 122 that defines a third surface 124 and a fourth surface 126, as well as a second peripheral edge 128. The first and second substantially transparent substrates 114, 122 define a cavity 130 that is configured to receive an electro-optic medium 132. The electro-optic medium 132 is configured to clear and darken, thereby adjusting the transmissivity of the electro-optic window assembly 100 as a whole. The window element 112 is sandwiched between a forward bezel 133 and a rearward bezel 135. In addition, a peripheral seal 137, which may include one or more parts, may extend about the window element 112 to seal the first peripheral edge 120 of the first substantially transparent substrate 114 to the second peripheral edge 128 of the second substantially transparent substrate 122, thereby sealing the electro-optic medium 132 within the cavity 130 (FIG. 8).

With reference again to FIGS. 10 and 11, the electro-optic window assembly 100 also includes a controller 134 that is operably coupled with to the window element 112 and is in electrical communication therewith. The controller 134 is configured to change a voltage applied to the electro-optic medium 132 to change the light transmissivity of the window element 112. As with the electro-optic window assembly 10, the electro-optic window assembly 100 is configured for use in a variety of the multi-passenger vehicles 40 illustrated in FIG. 1A. The controller 134 of the electro-optic window assembly 100 is disposed behind a protective substrate illustrated as a dust cover 142 and is configured to interact with, and receive user input from, a user interface 146. The user interface 146 may be configured to operate similar to, or identical to, the user interface 46 described above with reference to the electro-optic window assembly 10.

Referring again to FIG. 8, the user interface 146, similar to the user interface 46 described herein, generally includes an appliqué 144 that has indicia that is representative of a clear window state and indicia that is representative of a dark window state. In one example, the user interface 146, as illustrated, includes a clear window indicia 146A, a status bar 146B, and a dark window indicia 146C. In operation, the user may increase the transmittance of the window element 112 by touching the clear window indicia 146A until the status bar 146B indicates that maximum transmittance has been reached. It will be understood, however, that the user interface 146 may operate in any of a multitude of ways. A visual indication of no backlighting of the status bar 146B may be indicative that maximum transmittance has been obtained. The status bar 146B may provide information to the user by showing a decrease in illumination in the status bar 146B, or by showing lighting within the status bar 146B lessening from right to left as the window element 112 reaches the maximum transmittance. In another example, the status bar 146B may be used with, or replaced by, an elongate digital slide toggle 146D that includes sensor functionality, such that the user can touch the slide toggle 146D and, using a finger, slide from right to left (from the dark window indicia 146C to the clear window indicia 146A). The change in the capacitance as the finger moves across the slide toggle 146D is detected by the controller 134, which applies less voltage to the window element 112, thereby increasing the transmittance of the window element 112. The opposite function can also be performed. For instance, the user can touch the slide toggle 146D and instead slide a finger from left to right (from the clear window indicia 146A to the dark window indicia 146C). As the finger moves across the slide toggle 146D, the change in the capacitance is detected by the controller 134 and the controller 134 increases the voltage applied to the electro-optic medium 132 of the window element 112 and the transmittance of the window element 112 decreases.

With reference again to FIGS. 10 and 11, the user interface 146 is configured to nest within a lower portion of a rear housing generally defining a frame 170. A foam gasket 171 extends between the frame 170 and the dust cover 142. The foam gasket 171 is configured to accommodate the tolerances and the coefficient of thermal expansion between the dust cover 142 and the frame 170. A lower shield 173 extends from the frame 170 below the foam gasket 171. The frame 170 also supports the appliqué 144, the user interface 146, the clear window indicia 146A, the status bar 146B, and the dark window indicia 146C. The clear and dark window indicia 146A, 146C are aligned with and set over a switch or sensor 148 that is configured to receive instructions from the user and send a signal to the controller 134 to apply more voltage or apply less voltage to the electro-optic medium 132 disposed between the first substantially transparent substrate 114 and the second substantially transparent substrate 122, as described above. It is generally contemplated that the appliqué 144 and the sensor 148 may be back lit, for example, via one or more light emitting diodes (LEDs), so that interaction with the user interface 146 by a user can be done even in low ambient light conditions.

A circuit board assembly 150 of the controller 134 is configured to be positioned within, and received by, a carrier 160 that acts as a circuit board cover. The carrier 160 is disposed below the first and second substantially transparent substrates 114, 122. The circuit board assembly 150 includes a power and/or data connector 154 that extends downward from a bottom portion of the electro-optic window assembly 100. The power and/or data connector 154 is protected between a lower support 162 of the carrier 160 and the lower shield 173 during and after installation. The controller 134 receives instructions from the user through the user interface 146 and increases the voltage or decreases the voltage to the electro-optic medium 132 through a wiring assembly 184 that includes electrical contacts 182 in electrical communication with the electro-optic medium 132 disposed between the first substantially transparent substrate 114 and the second substantially transparent substrate 122.

With reference again to FIGS. 10 and 11, the sensor 148 is configured to extend through a slot 180 defined in the frame 170. The appliqué 144 extends over the sensor 148 and over the bottom portion of the frame 170. The carrier 160 is then secured via fasteners 192 to the circuit board assembly 150 and the lower portion of the frame 170 to secure the circuit board assembly 150 in place. At the same time, the power and/or data connector 154 extends downward proximate the lower shield 173 of the frame 170. The power and/or data connector 154 includes a latch bracket 196 that assists with connecting a complementary plug of the multi-passenger vehicle 40 to the electro-optic window assembly 100. A label 197 may be positioned over the circuit board assembly 150 that provides information related to source, part number, or any other identifying information related to the electro-optic window assembly 100.

The dust cover 142 is illustrated as having three parts. The dust cover 142 may include three separate panes of glass substrate. However, it is also contemplated that the dust cover 142 may include three panes of polymeric substrate or any other generally clear material known in the art. Additionally or alternatively, it will be understood that the dust cover 142 may be a single pane of polymeric substrate or glass substrate configured to protect the electro-optic window assembly 100, and specifically, the user interface 146. It is also generally contemplated that while the dust cover 42 may include a single pane construction, it is understood that the dust cover 42 may include a multi-pane construction or a single pane construction with one or more coatings configured to optimize durability, transmissivity, reflectivity, etc. Similar to electro-optic assembly 10, the electro-optic assembly 100 includes a thickness that is about 12.9 mm thick from the first substantially transparent substrate 114 to a back edge of the frame 170. In addition, the electro-optic window assembly 100 can withstand an abuse load of at least 680 Newtons over a 16 square inch area applied to a center of the window element 112.

In addition, the dust cover 142 may be supported by locating brackets 194 disposed on a top portion and a bottom portion of the dust cover 142, and which align the dust cover 142 to the frame 170. The locating brackets 194 center the dust cover 142 on the electro-optic window assembly 100 about a vertical centerline of the electro-optic window assembly 100. This serves to minimize movement of the dust cover 142. A bottom locating bracket 194 restricts the movement of the dust cover 142 horizontally and also restricts the dust cover 142 from moving vertically. This aids in aligning the appliqué 144 on the dust cover 142 relative to the LEDs or the circuit board assembly 150, keeping all or some of the indicia 146A, 146C, the status bar 146B, and the slide toggle 146D back lit uniformly. Similar to the dust cover 42, the dust cover 142 may also be any material including glass, clear polycarbonate, acrylic, etc. Connectors 200 (FIG. 8) may be used to secure the dust cover 142 to the frame 170.

The electro-optic window assembly, as set forth herein, is generally configured to provide a single assembly that may be connected with a plug interface disposed in any multi-passenger vehicle, such as an airplane, window frame. The power and/or data connector is operably coupled with the plug interface of the multi-passenger vehicle thereby providing data and/or power communications between the window element and the multi-passenger vehicle. By having the entire assembly put together as a single unit, complications resulting from additional components that are added during installation are minimized. In addition, the lean packaging of the electro-optic window assembly as a single unit provides for optimal use of space in and around windows of multi-passenger vehicles, thereby creating more room for other components of the multi-passenger vehicle or more room for passengers. In addition to the thin construction, the electro-optic window assemblies disclosed herein can withstand an abuse load of at least 680 Newtons over a 16 square inch area applied to a center of the window element of the electro-optic window assembly. Specifically, the electro-optic element and the protective substrate together can withstand a force load of 680 Newtons. With these thin profiles, the disclosed electro-optic window assemblies are easily installed, repaired, or replaced in any multi-passenger vehicle.

According to one aspect of the present disclosure, a unitary electro-optic window assembly includes a window element. A first substantially transparent substrate defines a first surface, a second surface, and a first peripheral edge. A second substantially transparent substrate defines a third surface, a fourth surface, and a second peripheral edge. The first and second substantially transparent substrates define a cavity therebetween. An electro-optic medium at least partially fills the cavity and is configured to reduce light transmissivity of the window element. A controller is adjacent to the window element and is in electrical communication therewith. The controller is configured to change a voltage applied to the electro-optic medium to change the light transmissivity of the window element. An interface is in electrical communication with the controller. A transparent dust cover is positioned over the window element, the controller, and the interface.

According to another aspect of the present disclosure, an interface includes a touch sensor.

According to still another aspect of the present disclosure, an interface includes indicia representative of a clear window state and indicia representative of a dark window state.

According to yet another aspect of the present disclosure, an interface further includes an elongate digital slide toggle disposed between an indicia representative of a clear window state and an indicia representative of a dark window state.

According to another aspect of the present disclosure, a transparent dust cover is in abutting contact with a first substantially transparent substrate.

According to yet another aspect of the present disclosure, an electro-optic window assembly includes a touch sensor. An appliqué is disposed between a transparent dust cover and the touch sensor.

According to still another aspect of the present disclosure, a touch sensor is a capacitive touch sensor.

According to still yet another aspect of the present disclosure, a touch sensor is configured to detect a change in capacitance through a transparent dust cover.

According to another aspect of the present disclosure, an electro-optic window assembly includes an electro-optic window element. A controller is operably coupled with the electro-optic window element and is in electrical communication therewith. The controller is configured to change a voltage applied to an electro-optic medium to change a light transmissivity of the electro-optic window element. An interface is in electrical communication with the controller. The interface includes an elongate digital slide toggle disposed between an indicia representative of a clear window state and an indicia representative of a dark window state.

According to yet another aspect of the present disclosure, an interface includes at least one capacitive touch sensor.

According to another aspect of the present disclosure, a clear window indicia is disposed on a first side of at least one capacitive touch sensor and a dark window indicia is disposed on a second side of the at least one capacitive touch sensor.

According to still another aspect of the present disclosure, a dust cover is disposed over a clear window indicia and a dark window indicia.

According to yet another aspect of the present disclosure, a carrier is disposed behind a dust cover and supports a circuit board operably coupled with an interface.

According to still another aspect of the present disclosure, a carrier includes a recess that receives a circuit board and an opening through which a power connector extends.

According to another aspect of the present disclosure, an electro-optic window assembly includes an electro-optic element that has a first substrate and a second substrate. An electro-optic medium is disposed between the first substrate and the second substrate and a frame is disposed about the electro-optic element. A carrier is disposed adjacent to an edge of the electro-optic element and is configured to receive a control unit. The control unit includes a controller that is operably coupled with the window element and in electrical communication therewith. The controller is configured to change a voltage applied to the electro-optic medium to change a light transmissivity of the window element. An interface is in electrical communication with the controller. The control unit also includes at least one of a power connector and a data connector. A protective substrate extends over the first substrate and the interface.

According to still another aspect of the present disclosure, a carrier supports a circuit board and is disposed behind a dust cover.

According to another aspect of the present disclosure, a protective substrate is a dust cover in abutting contact with a first substrate of a controller.

According to yet another aspect of the present disclosure, an electro-optic element and a protective substrate together can withstand a force load of 680 Newtons.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A unitary electro-optic window assembly comprising:
   a window element comprising:
     a first substantially transparent substrate defining a first surface, a second surface, and a first peripheral edge;
     a second substantially transparent substrate defining a third surface, a fourth surface, and a second peripheral edge, wherein the first and second substantially transparent substrates define a cavity therebetween, and wherein the first substantially transparent substrate is vehicle inward relative to the second substantially transparent substrate;
     an electro-optic medium at least partially filling the cavity and configured to reduce light transmissivity of the window element;
   a controller adjacent to the window element and in electrical communication therewith, the controller configured to change a voltage applied to the electro-optic medium to change the light transmissivity of the window element;
   an interface in electrical communication with the controller; and
   a transparent dust cover positioned over the first surface of the window element, the controller, and the interface.

2. The unitary electro-optic window assembly of claim 1, wherein the interface includes a touch sensor.

3. The unitary electro-optic window assembly of claim 1, wherein the interface includes indicia representative of a clear window state and indicia representative of a dark window state.

4. The unitary electro-optic window assembly of claim 3, wherein the interface further includes an elongate digital slide toggle disposed between the indicia representative of the clear window state and the indicia representative of the dark window state.

5. The unitary electro-optic window assembly of claim 3, further comprising:

a touch sensor; and an appliqué disposed between the transparent dust cover and the touch sensor.

6. The unitary electro-optic window assembly of claim 5, wherein the touch sensor is a capacitive touch sensor.

7. The unitary electro-optic window assembly of claim 6, wherein the touch sensor is configured to detect a change in capacitance through the transparent dust cover.

8. The unitary electro-optic window assembly of claim 6, wherein the indicia representative of the clear window state is disposed on a first side of the capacitive touch sensor.

9. The unitary electro-optic window assembly of claim 8, wherein the indicia representative of the dark window state is disposed on a second side of the capacitive touch sensor.

10. The unitary electro-optic window assembly of claim 1, wherein the transparent dust cover is in abutting contact with the first substantially transparent substrate.

11. The unitary electro-optic window assembly of claim 1, further comprising:

a carrier disposed behind the transparent dust cover, the carrier supporting a circuit board operably coupled with the interface.

12. The unitary electro-optic window assembly of claim 11, wherein the carrier includes a recess that receives the circuit board and an opening through which a power connector extends.

13. The unitary electro-optic window assembly of claim 1, wherein the transparent dust cover is in abutting contact with the controller.

14. The unitary electro-optic window assembly of claim 1, wherein the window element and the transparent dust cover together can withstand a force load of 680 Newtons.

\* \* \* \* \*